United States Patent [19]

Saito et al.

[11] Patent Number: 5,073,334

[45] Date of Patent: Dec. 17, 1991

[54] SELF-ACTUATED NUCLEAR REACTOR SHUTDOWN SYSTEM

[75] Inventors: Makoto Saito; Minoru Gunji, both of Mito, Japan

[73] Assignee: Doryokuro Kakunenryo Kaihatsu Jigyodan, Tokyo, Japan

[21] Appl. No.: 493,151

[22] Filed: Mar. 14, 1990

[30] Foreign Application Priority Data

Mar. 17, 1989 [JP] Japan .................................. 1-65072

[51] Int. Cl.$^5$ .............................................. G21C 7/12
[52] U.S. Cl. ...................................... 376/336; 376/353
[58] Field of Search ................ 376/327, 336, 337, 353

[56] References Cited

U.S. PATENT DOCUMENTS

| 3,976,540 | 8/1976 | Sowa | 376/336 |
| 4,304,632 | 12/1981 | Bhate et al. | 376/336 |
| 4,582,675 | 4/1986 | Germer | 376/336 |

FOREIGN PATENT DOCUMENTS

| 1439915 | 9/1969 | Fed. Rep. of Germany | 376/336 |
| 0107593 | 6/1985 | Japan | 376/353 |
| 0112996 | 5/1986 | Japan | 376/353 |

Primary Examiner—Harvey E. Behrend
Attorney, Agent, or Firm—Wenderoth, Lind & Ponack

[57] ABSTRACT

A self-actuated nuclear reactor shutdown system includes a control rod, a temperature sensitive electromagnet disposed above the control rod for causing the control rod to latch thereto and unlatch therefrom, and a control rod insertion portion around which a plurality of wrapper tubes each accommodating a fuel assembly are arranged. The present invention is characterized in that the upper part of the wrapper tube or an extension tube connected to the upper end of the wrapper tube is made of a temperature-sensitive magnetic material having a characteristic by which the saturation flux density thereof will be reduced at the time of an extraordinary rise in the temperature of a coolant flowing through the fuel assembly. The temperature sensitive magnetic material constitutes a part of a magnetic circuit of the electromagnet. When the coolant at a high temperature raises the temperature of the temperature-sensitive magnetic material, the magnetic circuit of the electromagnet is broken, and the control rod is released from the electromagnet and drops into the reactor core to shut down the reactor.

3 Claims, 3 Drawing Sheets

SELF-ACTUATED NUCLEAR REACTOR SHUTDOWN SYSTEM

BACKGROUND OF THE INVENTION

The present invention relates to a self-actuated nuclear reactor shutdown system wherein a control rod suspended by a temperature sensitive electromagnet (TSEM) is automatically separated or detached from the TSEM and is inserted into a reactor core to effect an emergency shutdown of the reactor when the temperature of a coolant rises in an extraordinary manner. In the present invention, a temperature sensitive magnetic material (TSMM) is located in the wall of wrapper tubes adjacent to a control rod guide tube and constitutes a part of a magnetic circuit of the TSEM. Therefore, the response to the thermal transient can be improved and the stability in the actuation of the TSEM can also be expected.

The reactor shutdown system of the present invention can be utilized for fast breeder reactors, light water reactors and the like.

Nuclear reactors of various types are provided with some back-up control rods to be inserted into a reactor core when anything unusual occurs, in addition to control rods for power control, in order to enhance the reliability of the reactor shutdown. For a reactor shutdown system, it has been proposed that a TSEM in which a TSMM is provided as a part of the magnetic circuit thereof is installed inside the reactor core so as to implement the retention and separation of the control rod. As for the TSEM, a ferromagnetic material which has a suitable Curie point is employed to break the magnetic circuit by decreasing saturation flux density when the temperature of the TSEM is close to the Curie point.

During a normal operation of the nuclear reactor, the control rod is suspended at the upper part of the control rod guide tube by the TSEM. When the temperature of the coolant flowing through a fuel assembly rises due to an extraordinary accident, the TSMM transforms from a ferromagnetic substance to a nonmagnetic one. Therefore, the magnetic circuit of the electromagnet is broken at the TSMM and the TSEM no longer exerts its holding force. Consequently, the control rod can be spontaneously unlatched from the TSEM and inserted into the reactor core and the reactor is shut down.

It has been proposed in the prior art to provide some structure to introduce hot coolant from the fuel assembly to the TSEM such as, for example, a coolant introduction pipe, in order to prospectively obtain a quick response of the TSEM to thermal transient of the coolant.

Such a prior art structure as described above, however, employs a complicated mechanism for introducing the coolant flowing through an adjacent fuel assembly into the control rod guide tube, and cannot provide high reliability.

Besides, it is expected that a response time will be longer when the flow rate of the coolant decreases, because the flow rate of the coolant at a high temperature introduced into the control rod guide tube cannot be increased in comparison with the mass of the TSMM. Moreover, in the structure wherein the control rod guide tube is used as a part of the magnetic circuit, the vertical relative position between the electromagnet and the control rod guide tube must always be controlled with high precision, and this impairs the intrinsic feature of the self-actuated shutdown system which is to actuate without any external control.

SUMMARY OF THE INVENTION

An object of the present invention is to provide a self-actuated nuclear reactor shutdown system which improves the thermal transient response and reduces the influence of the flow of the coolant to thereby enhance the reliability of an actuation characteristic of the system.

Another object of the present invention is to provide a self-actuated nuclear reactor shutdown system which dispenses with the control of the relative position between the electromagnet and the control rod guide tube and prevents the occurrence of a spurious actuation or a non-actuation of the control rod.

The present invention provides an improvement in a self-actuated nuclear reactor shutdown system which comprises a control rod, a temperature sensitive electromagnet (TSEM) disposed above the control rod for causing the control rod to latch thereto and unlatch therefrom, and a control rod insertion portion around which a plurality of wrapper tubes each receiving a fuel assembly are arranged.

According to the present invention, in order to accomplish the above-described objects, an upper part of a wall of each of the wrapper tubes arranged around the control rod insertion portion is made of a temperature sensitive magnetic material (TSMM) having a characteristic whereby the saturation flux density thereof will be reduced when there is an extraordinary rise in the temperature of a coolant flowing through the fuel assembly. The TSMM constitutes a part of a magnetic circuit of the electromagnet.

It is also possible to accomplish the above-described objects by connecting an extension tube made of the TSMM to the upper end of the wrapper tube, so that the TSMM of the extension tube constitutes a part of the magnetic circuit of the electromagnet.

The upper part of the wall of the wrapper tube or the extension tube made of the TSMM may have a length equal to the vertical stroke of the electromagnet. It is also possible that the TSMM is provided only in an area in which the electromagnet is set during a normal operation of a nuclear reactor and the part of the wall of the wrapper tube below the area is made of a ferromagnetic material extending over the range of the vertical stroke of the electromagnet.

The electromagnet has an iron core and an armature capable of latching with an unlatching from the iron core, and a coil wound on the iron core. A nonmagnetic material is incorporated in a part of the iron core in the proximity of the TSMM.

In the present invention, since the upper part of each wrapper tube arranged around the control rod insertion portion or the extension tube of the wrapper tube is made of the TSMM, the TSMM can be heated directly by the coolant at a high temperature coming out of the fuel assembly. Therefore, it is unnecessary to worry about uncertain factors such as the unstable flow of the coolant and the like, and extraordinary rise in the coolant temperature can be detected rapidly.

The operation of the TSEM retaining the control rod is basically the same as that in the prior art. During normal operation of the reactor, the TSMM exhibits a ferromagnetic property, and the TSEM can support the control rod. In the case of an accident wherein the coolant temperature rises in an extraordinary manner in the reactor, the coolant at a high temperature coming out of the fuel assembly raises the temperature of the TSMM and therefore the saturation flux density of the material decreases. Consequently, the supporting force exerted by the TSEM is terminated. Therefore, the control rod is released and inserted into the core and thus the reactor is shut down.

DETAILED DESCRIPTION OF THE PREFERRED EMBODIMENTS

Figure 1A:
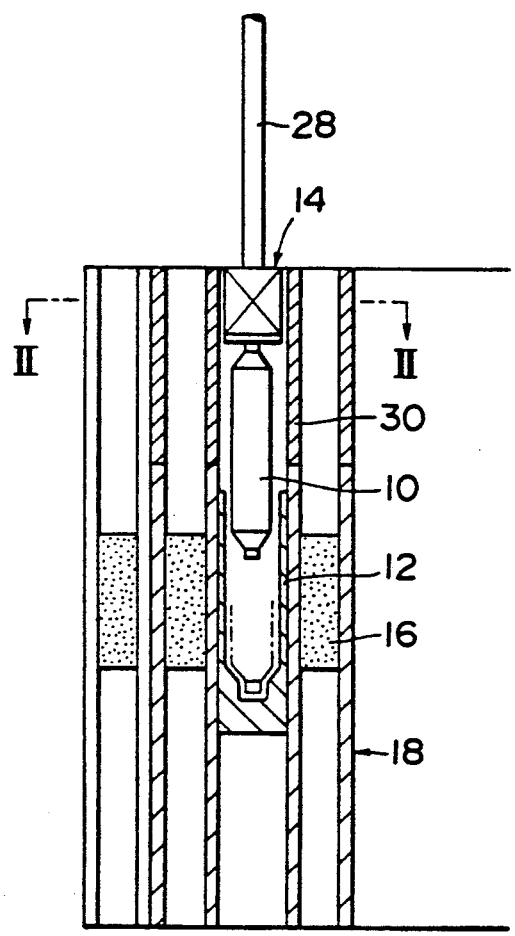
FIGS. 1A and 1B are schematic diagrams of one embodiment of a self-actuated reactor shutdown system of the present invention.
Figure 2:
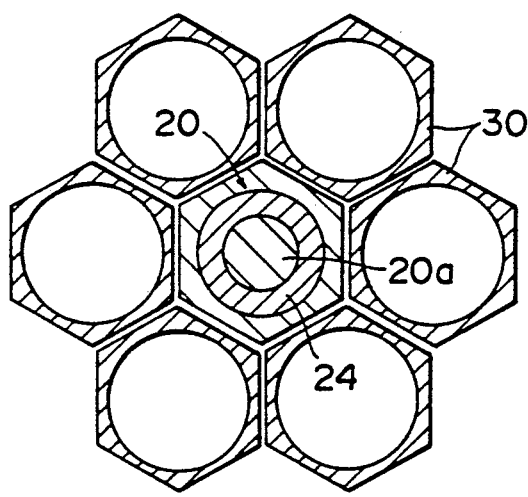
FIG. 2 is a sectional view taken along line II-II in FIG. 1A.

As shown in FIG. 1A, a control rod 10 having therein a neutron absorber is suspended by an electromagnet (TSEM) 14 located above a control rod guide tube 12. Around the control rod guide tube 12 are disposed wrapper tubes 18 accommodating fuel assemblies 16, respectively (See FIG. 2). A coolant (not shown) flows upwardly through the fuel assemblies 16 in the wrapper tubes 18.

Figure 3:
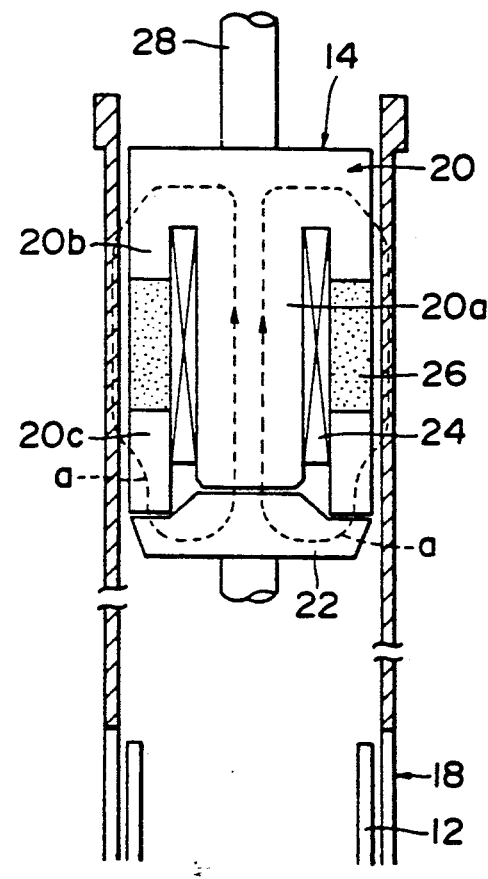
FIG. 3 is an enlarged schematic diagram of a TSEM used in the system of the present invention.

The principal part of the electromagnet 14 comprises, as shown in FIG. 3, a combination of an iron core 20 and an armature 22 capable of vertically latching to and unlatching from the iron core 20, and a coil 24 wound around the central leg part 20a of the iron core 20. The outer ferromagnetic member of the iron core 20 is divided into two portions 20b, 20c which are magnetically isolated from each other by a nonmagnetic material 26 interposed therebetween. The iron core 20 is connected to a drive shaft 28 on the upper side, while the armature 22 is connected to the control rod 10 on the lower side.

The main feature of the present invention resides in that the upper part (at least a part facing the abovedescribed nonmagnetic material 26) of each of the wrapper tubes 18 of the adjacent fuel assemblies is made of a TSMM 30 and constitutes a part of the magnetic circuit of the electromagnet 14. This TSMM 30 has a magnetic characteristic whereby the saturation flux density thereof is reduced when the coolant temperature rises extraordinarily.

At a normal operation temperature, the temperature of the TSMM 30 above the adjacent fuel assemblies 16 is below its Curie-point, and the magnetic circuit shown by a broken line a in FIG. 3 is formed. In this way, the control rod 10 is retained and suspended by the electromagnet 14.

When the coolant temperature rises due to the occurrence of any abnormality in the fuel assemblies 16 or the like, the temperature of the wrapper tube 18 at a part above the fuel assembly 16 rises rapidly, and the magnetic circuit is broken at the time when the temperature exceeds the Curie-point of the TSMM 30 constituting a part of the wrapper tube 18. Then the magnetic force supporting the armature 22 is reduced, and the control rod 10 drops to be inserted into the core of the reactor as shown by a phantom line in FIG. 1A. Thus the reactor is shut down.

Figure 1B:
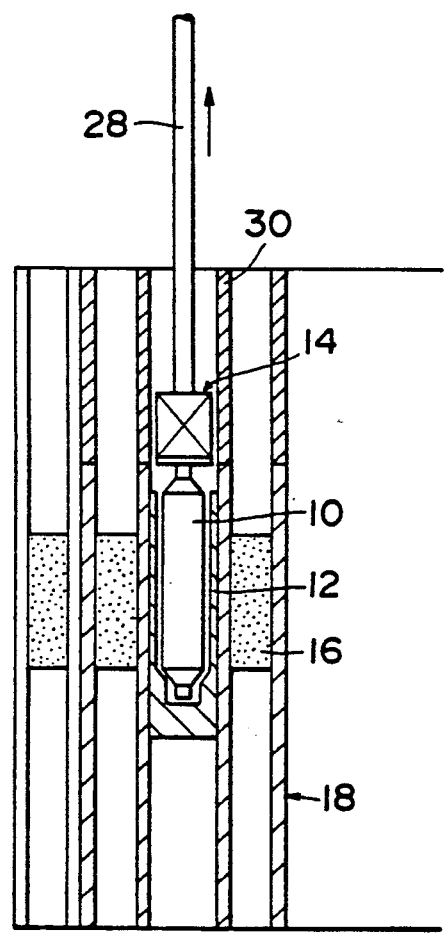

A resetting or initial setting of the control rod 10 is conducted in the following manner. As shown in FIG. 1B, the main part of the electromagnet moves to the upper end of the control rod 10 located in the bottom position, and at this position the armature 22 is latched magnetically to retain the control rod 10. In order to enable the implementation of this operation, the TSMM 30 is provided over the range of the vertical stroke of the electromagnet 14 in the present embodiment. In other words, the length of the TSMM 30 is equal to the stroke of the control rod 10 (a length of a fuel-charged part in the wrapper tube 18). The electromagnet 14 and the control rod 10 joined in one body are pulled up by the drive shaft 28 and are set in a predetermined position.

Although the control rod guide tube 12 cannot be installed within the range of the vertical stroke of the electromagnet 14, a short one can be employed as shown in FIGS. 1A, 1B. Such an installation is easily accommodated for, by making some modifications in a handling device for refueling or the like, despite the control rod guide tube 12 being shorter than a conventional one.

Figure 4:
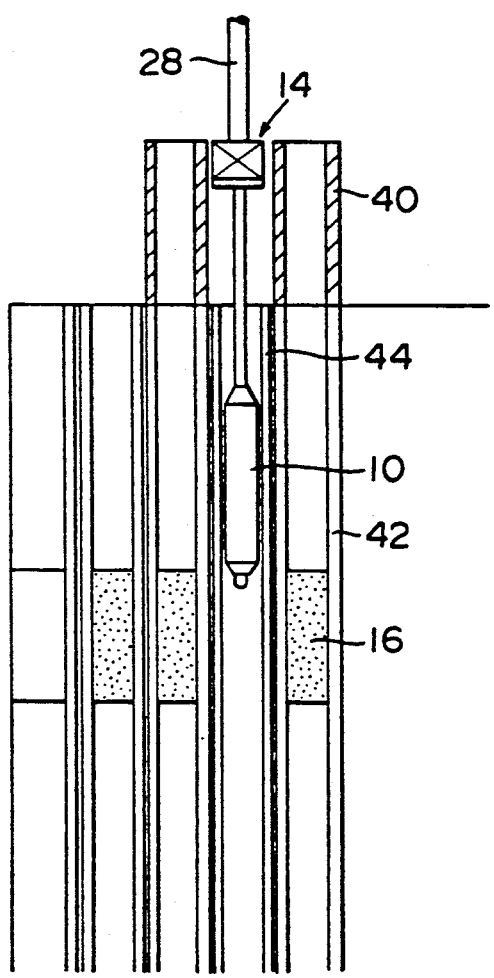
FIG. 4 is a schematic diagram of another embodiment of the present invention.
Figure 5:
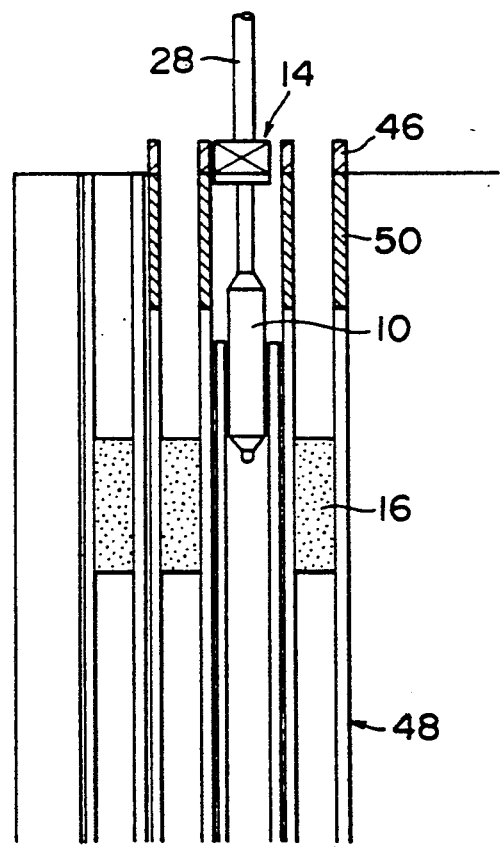
FIG. 5 is a schematic diagram of still another embodiment of the present invention.

The shape of the TSMM and the position of installation thereof can be modified variously. Examples of such modifications are shown in FIGS. 4 and 5. Since the basic concept is the same as that of the above-mentioned embodiment, the same reference numerals are used to designate corresponding components for simplicity and detailed descriptions thereof are omitted.

FIG. 4 shows an example wherein an extension tube 40 made of the TSMM having a length equal to the stroke of vertical movement of the electromagnet 14 is attached to the upper end of a wrapper tube 42. According to this structure, the wrapper tube 42 and control rod guide tube 44 can be conventional, and so this structure is easy to put into practice. However, the time required for the arrival of the high temperature coolant at the TSMM becomes longer by an amount corresponding to the additional length of the extension tube 40.

FIG. 5 shows another example wherein an extension tube 46 made of the TSMM is fitted to the upper end of the wrapper tube 48 to cover only the set position of the electromagnet 14 during normal operation. The upper part of the wrapper tube 48 located in the range of the vertical stroke of the electromagnet 14 is made of a ferromagnetic material 50, such as Cr-Mo steel or ferrite stainless steel, for instance, which is inexpensive and easy to manufacture.

While the preferred embodiments of the present invention are described in the foregoing, the present invention is not limited only to these embodiments. For example, the upper part of the wall of the wrapper tube itself may be made of the TSMM and the ferromagnetic material. In any case, the TSMM has to only be provided at an area constituting part of the magnetic circuit in the wall (at least on the electromagnet side) of the adjacent wrapper tubes.

The present invention enables a very quick response to an extraordinary rise in the temperature of the coolant, because the wrapper tube itself accommodating the fuel assembly or the extension tube of the wrapper tube is made of the TSMM. Further, since the flow of the coolant in the wrapper tube is stable, the problems presented by the conventional structure in which insufficient coolant may be introduced into the control rod guide tube can be avoided. Namely, the present invention can avoid the problems in which the coolant to be introduced into the control rod guide tube is unstable and the introduced coolant is insufficient with respect to the mass of the TSMM. As a result, a response to accidents, as well as the reliability of an actuation characteristic, are improved.

Moreover, it is unnecessary to control the relative position between the electromagnet and the control rod guide tube, since the area of TSMM of the wrapper tube can be made large enough. Therefore, spurious actuation or non-actuation due to positional slippage are eliminated, and the reliability is improved in this respect as well.

What is claimed is:

1. In a nuclear system having a core of a plurality of wrapper tubes, and a fuel assembly disposed within each of the tubes, a self-actuated nuclear shutdown system comprising:
    a control rod guide tube surrounded by the wrapper tubes of the core of the nuclear system with a space defined directly above the guide tube being surrounded by upper ends of the wrapper tubes,
    a control rod disposed coaxially with said control rod guide tube;
    an electromagnet disposed above said control rod in the nuclear system;
    drive shaft means connected to said electromagnet for moving said electromagnet axially of said control rod guide tube over a predetermined distance;
    temperature-sensitive magnetic material forming the upper end of each of the wrapper tubes,
    the temperature-sensitive magnetic material of the wrapper tubes disposed entirely above the level at which the upper end of said control rod guide tube is located in the nuclear system, said upper ends of the wrapper tubes formed of the temperature-sensitive magnetic material each having an axial length equal to said predetermined distance over which said drive shaft means moves said electromagnet, and the temperature-sensitive magnetic material having a characteristic by which the saturation magnetic flux density thereof is reduced when the temperature thereof is raised above its Curie-point;
    said temperature-sensitive material and said electromagnet operable to establish a magnetic circuit which latches said control rod to said electromagnet, when the electromagnet is positioned in said space surrounded by the upper ends of the wrapper tubes and the temperature thereof is below its Curie-point,
    the magnetic circuit being broken when coolant flowing in the nuclear system through the wrapper tubes reaches a temperature sufficient to raise the temperature of the temperature-sensitive magnetic material above its Curie-point, whereupon said control rod will become unlatched from said electromagnet so as to drop into said control rod guide tube.

2. In a nuclear system having a core of a plurality of wrapper tubes, and a fuel assembly disposed within each of the tubes, a self-actuated nuclear shutdown system comprising:
    a control rod guide tube surrounded by the wrapper tubes of the core of the nuclear system,
    a control rod disposed coaxially with said control rod guide tube;
    an electromagnet disposed above said control rod in the nuclear system;
    drive shaft means connected to said electromagnet for moving said electromagnet axially of said control rod guide tube over a predetermined distance;
    a respective extension tube of temperature-sensitive magnetic material extending coaxially from an upper end of each of the wrapper tubes, and the extension tubes surrounding a space directly above said control rod guide tube in the nuclear system,
    each said extension tube disposed entirely above the level at which the upper end of said control rod guide tube is located in the nuclear system, and having an axial length equal to said predetermined distance over which said drive shaft means moves said electromagnet, and
    the temperature-sensitive magnetic material having a characteristic by which the saturation magnetic flux density thereof is reduced when the temperature thereof is raised above its Curie-point;
    said temperature-sensitive material nd said electromagnet operable to establish a magnetic circuit which latches said control rod to said electromagnet, when the electromagnet is positioned within said space surround by the extension tubes and the temperature thereof is below its Curie-point,
    the magnetic circuit being broken when coolant flowing the nuclear system through the wrapper tubes reaches a temperature sufficient to raise the temperature of the temperature-sensitive magnetic material above its Curie-point, whereupon said control rod will become unlatched from said electromagnet so as to drop into said control rod guide tube.

3. In a nuclear system having a core of a plurality of wrapper tubes, and a fuel assembly disposed within each of the tubes, a self-actuated nuclear shutdown system comprising:
    a control rod guide tube surrounded by the wrapper tubes of the core of the nuclear system with a space defined directly above the guide tube being surrounded by upper ends of the wrapper tubes,
    a control rod disposed coaxially with said control rod guide tube;
    an electromagnet disposed above said control rod in the nuclear system;
    drive shaft means connected to said electromagnet for setting said electromagnet at a predetermined position during normal operation of the nuclear system and for moving said electromagnet axially of said control rod guide tube over a predetermined distance;
    ferromagnetic material forming the upper end of each of the wrapper tubes,
    the ferromagnetic material of the wrapper tubes disposed entirely above the level at which the upper end of said control rod guide is located in the nuclear system, and said upper ends of the wrapper tubes formed of the ferromagnetic material each having an axial length equal to said predetermined distance over which said drive shaft means moves said electromagnet;
    a respective extension tube of temperature-sensitive magnetic material extending coaxially from the upper end of each of the wrapper tubes with a space defined directly above said guide rod control tube being surrounding by the extension tubes, each said extension tube disposed adjacent said predetermined position, and the temperature-sensitive magnetic material having a characteristic by which the saturation magnetic flux density thereof is reduced when the temperature thereof is raised above its Curie-point;

said temperature-sensitive material and said electromagnet operable to establish a magnetic circuit which latches said control rod to said electromagnet, when the electromagnet is positioned in said space surrounded by said extension tubes and the temperature thereof is below its Curie-point, the magnetic circuit being broken when coolant flowing in the reactor system through the wrapper tubes reaches a temperature sufficient to raise the temperature of the temperature-sensitive magnetic material above its Curie-point, whereupon said control rod will become unlatched from said electromagnet so as to drop into said control rod guide tube.

* * * * *